United States Patent
Fukutani et al.

(10) Patent No.: US 8,132,957 B2
(45) Date of Patent: Mar. 13, 2012

(54) KNEADING DISC SEGMENT AND TWIN-SCREW EXTRUDER

(75) Inventors: Kazuhisa Fukutani, Kobe (JP); Sayaka Yamada, Kobe (JP); Yasuaki Yamane, Takasago (JP); Kazuo Yamaguchi, Takasago (JP)

(73) Assignee: Kobe Steel, Ltd., Kobe-shi (JP)

( * ) Notice: Subject to any disclaimer, the term of this patent is extended or adjusted under 35 U.S.C. 154(b) by 615 days.

(21) Appl. No.: 12/346,150

(22) Filed: Dec. 30, 2008

(65) Prior Publication Data

US 2009/0213683 A1 Aug. 27, 2009

(30) Foreign Application Priority Data

Feb. 25, 2008 (JP) .................. 2008-042896

(51) Int. Cl.
*B01F 7/10* (2006.01)
(52) U.S. Cl. ................ 366/79; 366/82; 366/90
(58) Field of Classification Search .............. 366/79, 366/82, 90
See application file for complete search history.

(56) References Cited

U.S. PATENT DOCUMENTS

| 6,170,975 | B1 | 1/2001 | Andersen |
| 7,244,060 | B2 | 7/2007 | Inoue et al. |

FOREIGN PATENT DOCUMENTS

| DE | 101 03 094 A1 | | 8/2001 |
| EP | 1 832 407 A1 | | 9/2007 |
| FR | 2 635 044 | | 2/1990 |
| FR | 2635044 | * | 2/1990 |
| GB | 687021 | | 2/1953 |
| JP | 2003-245534 | | 9/2003 |
| JP | 2004-17417 | | 1/2004 |
| JP | 2007-237679 | | 9/2007 |
| KR | 10-2007-0092625 | | 9/2007 |

OTHER PUBLICATIONS

Office Action issued Dec. 16, 2010, in Korea Patent Application No. 10-2009-15082 (with English translation).

* cited by examiner

*Primary Examiner* — Joseph Del Sole
*Assistant Examiner* — James Sanders
(74) *Attorney, Agent, or Firm* — Oblon, Spivak, McClelland, Maier & Neustadt, L.L.P.

(57) ABSTRACT

The kneading disc segment according to the present invention comprises plural disc sets each comprising two kneading discs and mounted on a kneading screw (3) which is for kneading a material while feeding the material to a downstream side. Disc sets each comprising a first kneading disc positioned on an upstream side and a second kneading disc, the second kneading disc being mounted continuously with and downstream of the first kneading disc so as to have a phase difference δ of an acute angle relative to the first kneading disc, are disposed continuously in the axial direction of the kneading screw. The first kneading discs in two continuous disc sets have a phase difference of 180°. With this construction, it is possible to attain a higher degree of kneading than in the conventional neutral kneading disc segment.

3 Claims, 5 Drawing Sheets

δ = 60°

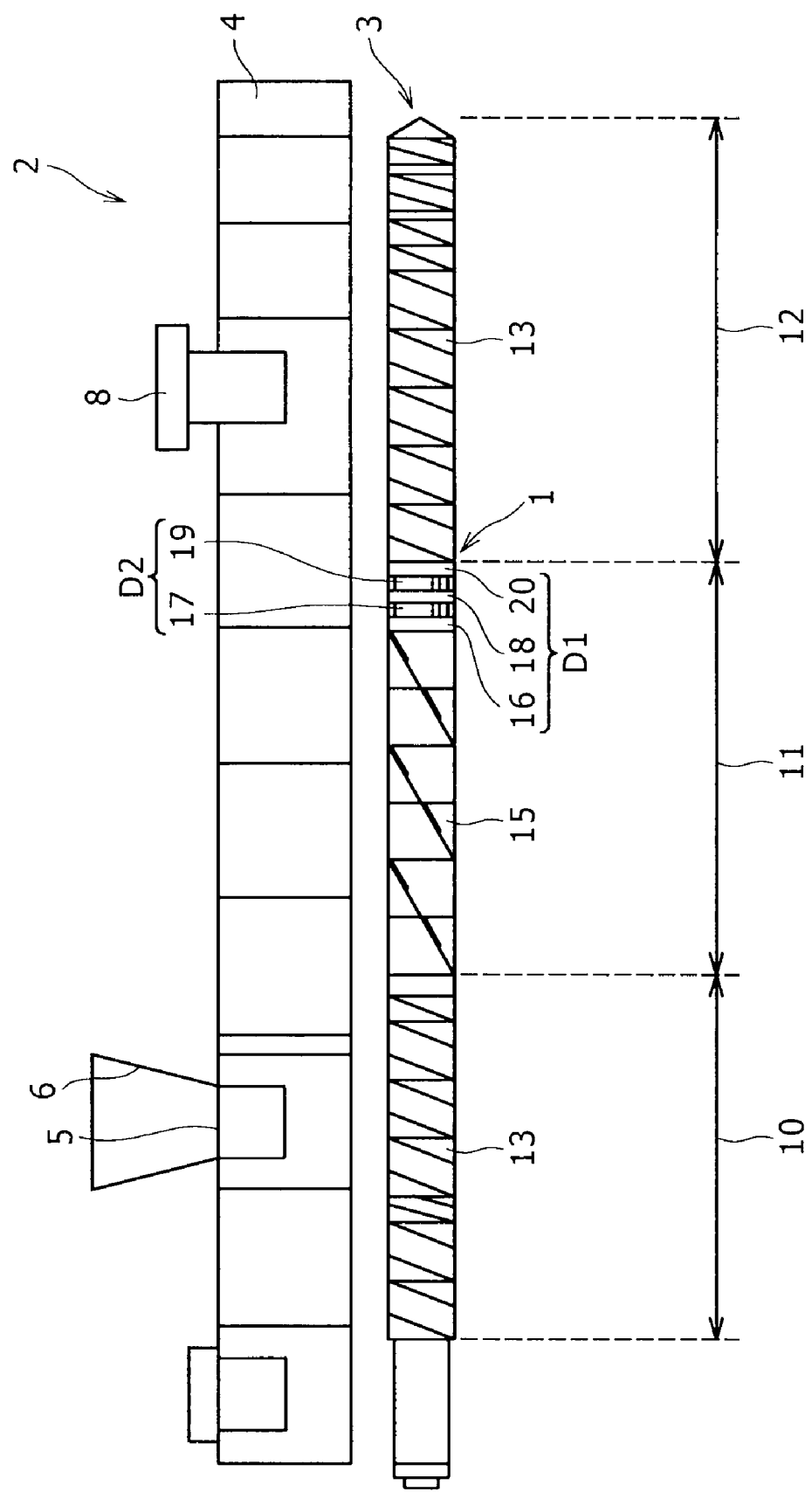

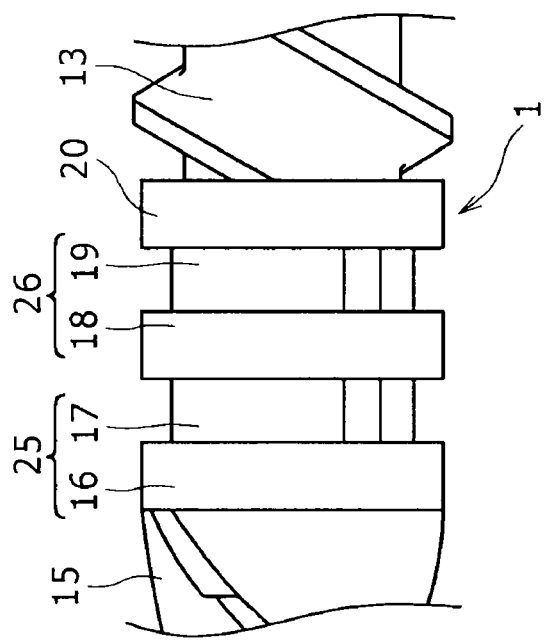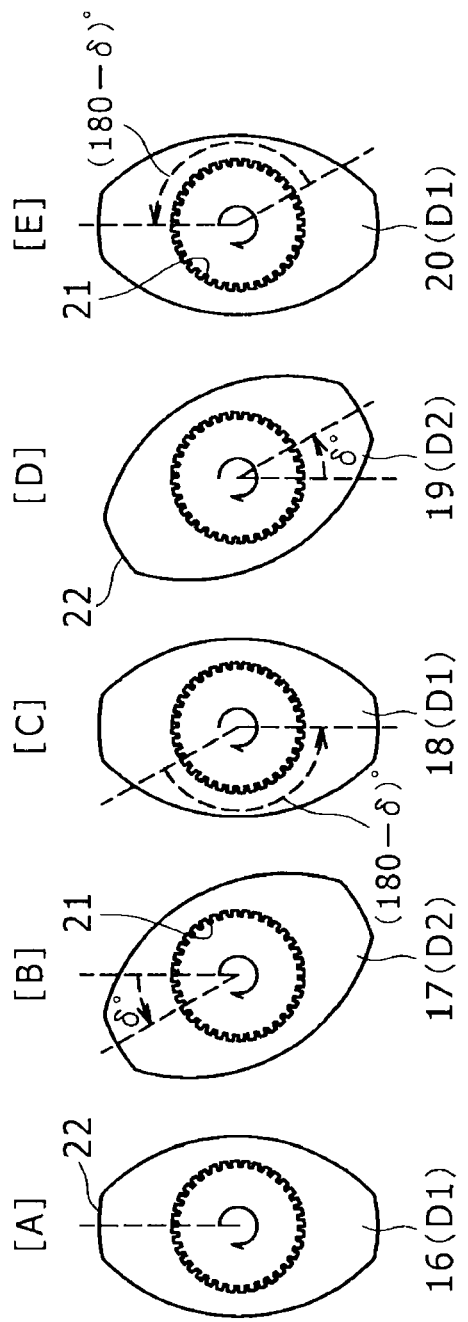
FIG.2A
FIG.2B

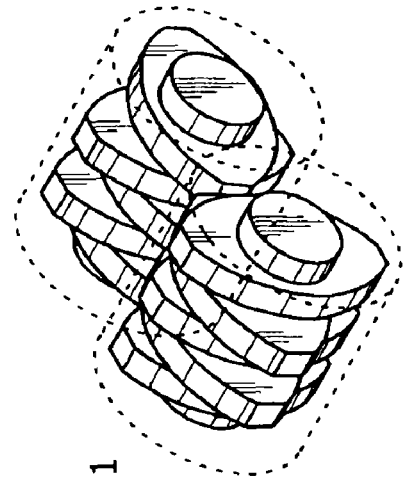
FIG. 3A  δ=30°
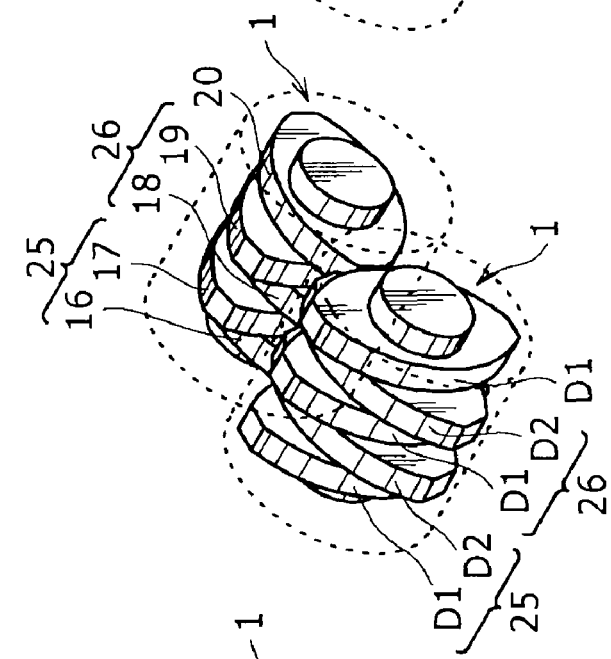
FIG. 3B  δ=60°
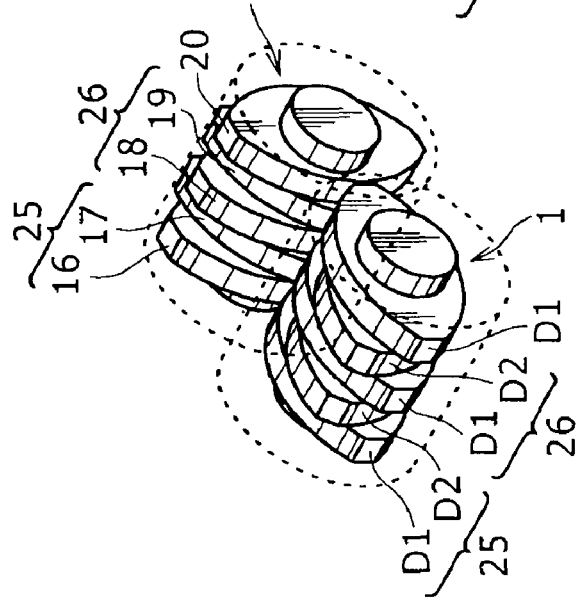
FIG. 3C  δ=90°
NEUTRAL KNEADING DISC

KNEADING DISC SEGMENT AND TWIN-SCREW EXTRUDER

BACKGROUND OF THE INVENTION

1. Field of the Invention

The present invention relates to a kneading disc segment and a twin-screw extruder having kneading screws each provided with the kneading disc segment.

2. Description of the Related Art

Generally, in a twin-screw extruder, polymeric resin pellets as matrix and a powdered additive are fed into a barrel and are fed to a downstream side while being kneaded by a pair of kneading screws inserted into the barrel, thereby a compound resin material such as a plastic compound is produced. The kneading screws are each provided with a central spline shaft and plural segments, the plural segments being fixed in a state in which the spline shaft extends therethrough, namely, fixed in a skewered state. Plural kinds of segments are known as segments constituting a kneading screw. In a kneading screw, these segments are combined axially to permit kneading suitable for predetermined use and material.

Among the segments referred to above, the segment particularly suitable for kneading is called a kneading segment. A rotor segment and a kneading disc segment are known as kneading segments. Particularly, a kneading disc segment is used in the case where a high degree of kneading is required.

A kneading disc segment is constituted by plate-like kneading discs each having a generally elliptical sectional shape perpendicular to the axial direction of a kneading screw, the kneading discs being arranged continuously side by side in the axial direction. In the kneading disc segment, the kneading discs rotate with rotation of the kneading screw, thereby the material to be kneaded is conducted to between the kneading discs and an inner wall of a barrel and is kneaded.

Two kinds of segments are known as kneading disc segments, which are classified according to the manner of mounting the kneading discs (mounting angle to a spline shaft). One is a feed kneading disc segment in which plural kneading discs are mounted continuously with a phase difference at a predetermined pitch of 30°-60° in a reverse rotational direction of a kneading screw. The other is a neutral kneading disc segment in which kneading discs are mounted continuously with a phase difference of 90° pitch.

The feed kneading disc segment has a feed capacity for the material to be kneaded because kneading discs are arranged twistedly in the axial direction. On the other hand, the neutral kneading disc segment has scarcely any feed capacity for the material. In the neutral kneading disc segment, therefore, kneading is easy to be done to a satisfactory extent because the material stays in the kneading section, and the degree of kneading can be enhanced in comparison with the feed kneading segment.

As the neutral kneading segment referred to above there is known, for example, such a neutral kneading segment as is disclosed in Japanese Patent Laid-Open Publication No. 2003-245534. This neutral kneading disc segment is disposed in an axially intermediate portion of a kneading screw and is composed of five kneading discs which are continuous in the axial direction. The five kneading discs are arranged in such a manner that adjacent discs intersect each other at an angle of 90° relative to the axis center of the kneading screw, thereby permitting a high kneading capacity to be exhibited.

The kinds of materials to be kneaded have recently been increasing and extruders are now required to exhibit a high kneading capacity than before.

The neutral kneading disc segment disclosed in the above Japanese patent laid-open publication No. 2003-245534 possesses a high kneading capacity as noted above, but even the degree of kneading attained by using the neutral kneading disc segment is not satisfactory in comparison with the degree of kneading required recently.

SUMMARY OF THE INVENTION

The present invention is accomplished in view of the above-mentioned problem and it is an object of the invention to provide a novel kneading disc segment capable of affording a higher degree of kneading than that of the conventional neutral kneading disc segment, as well as a twin-screw extruder using such a kneading disc segment.

More particularly, according to the present invention there is provided a kneading disc segment mounted on a kneading screw which is for kneading a material while feeding the material to a downstream side, and constituted by a combination of plural kneading discs, the kneading disc segment comprising a plurality of disc sets disposed continuously in the axial direction of the kneading screw, the disc sets each comprising a first kneading disc and a second kneading disc, the second kneading disc being mounted continuously with and downstream of the first kneading disc so as to have a phase difference $\delta$ of an acute angle relative to the first kneading disc, wherein the first kneading discs in the plural continuous disc sets have a phase difference of 180° with each other.

When the neutral kneading disc segment is seen in its section perpendicular to the axis, there is a large gap between adjacent kneading discs, so that during kneading, the material to be kneaded is apt to move (drop out) to the downstream side in a state of being not fully kneaded by the succeeding kneading disc. Therefore, in order to enhance the degree of kneading to a satisfactory extent, the present inventors thought it is necessary to effect kneading concentratedly before the movement of the material. Then it has been found out that the degree of kneading is improved by disposing the kneading discs in such a manner as the adjacent gaps narrowing with each other. In this way the present invention has been completed.

More specifically, if the second kneading disc having a phase difference $\delta$ of an acute angle relative to the first kneading disc is disposed so as to make up for the gap between the adjacent first kneading discs and if plural such disc sets are disposed continuously in the axial direction of the kneading screw as described above, it is possible to suppress drop-out of the material from the gap and thereby possible to knead the material in a concentrated manner, thus making it possible to afford a higher degree of kneading than in the conventional neutral kneading disc segment.

The above kneading disc segment according to the present invention is characterized in that the first kneading discs in the plural continuous disc sets have a phase difference of 180° with each other, in other words, the first kneading disc in a downstream-side disc set in the plural continuous disc sets has a phase difference of $(180-\delta)°$ relative to the second kneading disc in an upstream-side disc set. Therefore, kneading discs are never arranged continuously with an equal phase difference (with an equal gap) and there scarcely occurs any feed capacity for the material. Consequently, in these kneading disc segments, the material is easy to stay in the kneading section and becomes easy to be kneaded concentratedly. As a result, kneading is performed to a satisfactory extent and the degree of kneading can be improved remarkably.

It is preferable that the phase difference be in the range of 30° to 68°, thereby the material is easy to stay in the kneading section and the drop-out thereof is sure to be prevented, thus making it possible to enhance the degree of kneading.

Further, in a twin-screw extruder equipped with two co-rotating intermeshed type kneading screws each having the aforesaid kneading segment, it becomes easy to obtain a high degree of kneading.

With the kneading disc segment according to the present invention, it is possible to obtain a higher degree of kneading than in the conventional neutral kneading disc segment.

BRIEF DESCRIPTION OF THE DRAWINGS

FIG. 1 is a front view of an extruder having a kneading disc segment according to a first embodiment of the present invention;

FIG. 2A is an enlarged front view of the kneading segment and FIG. 2B is a sectional view of kneading discs which constitute the kneading disc segment;

FIG. 3A is a perspective view of a kneading disc segment having a phase difference of 30°, FIG. 3B is a perspective view of a kneading disc segment having a phase difference of 60°, and FIG. 3C is a perspective view of a neutral kneading disc segment;

DETAILED DESCRIPTION OF A PREFERRED EMBODIMENT

Figure 4:
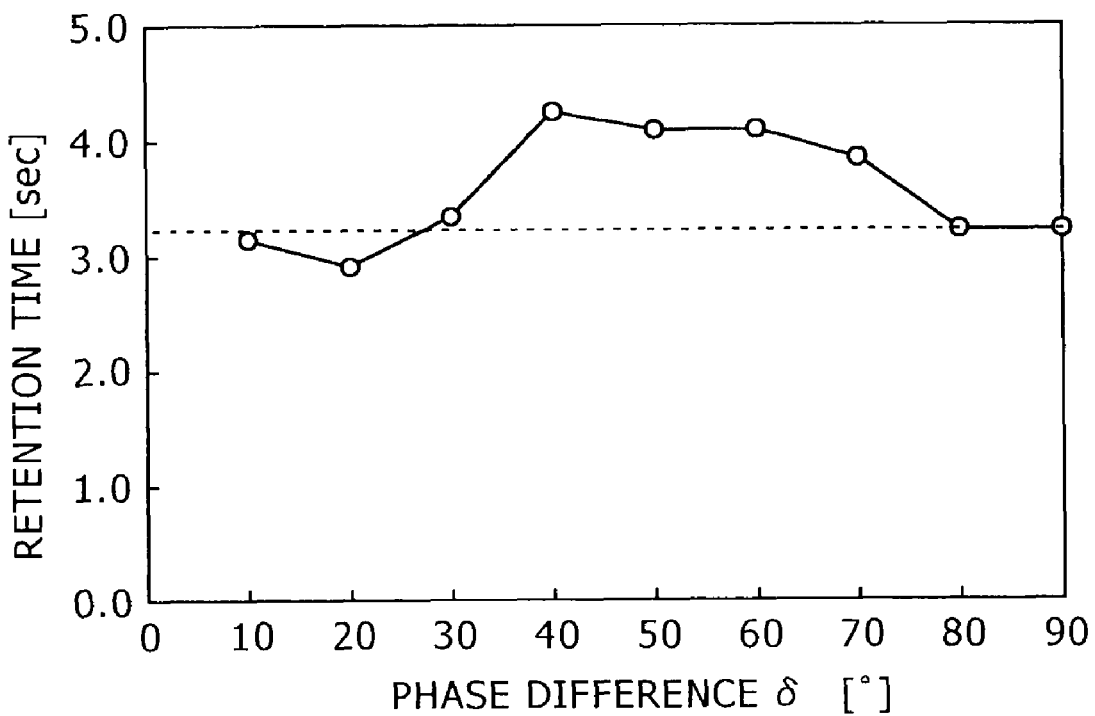
FIG. 4 illustrates a change of retention time relative to the phase difference δ.

A kneading disc segment 1 according to a first embodiment of the present invention will be described below with reference to the drawings.

First Embodiment

As shown in a schematic diagram of FIG. 1, the kneading disc segment 1 of the first embodiment is mounted on kneading screws 3 of a co-rotating intermeshed twin-screw extruder 2 (hereinafter referred to simply as the extruder 2 as the case may be). The twin-screw extruder 2 includes a hollow barrel 4 and kneading screws 3 inserted axially into the interior of the barrel 4. In the extruder 2, therefore, when a material is supplied into the barrel 4 and the kneading screws 3 are rotated, the material present within the barrel 4 is kneaded and is fed to a downstream side.

In connection with the following description of the extruder 2 it is assumed that the left side on the paper surface of FIG. 1 is an upstream side and the right side thereof is a downstream side, that the right-left direction on the paper surface of FIG. 1 is an axial direction and that the direction perpendicular to the axial direction is a perpendicular-to-axis direction.

The barrel 4 is formed in a cylindrical shape which is long in the axial direction, and the interior thereof is hollow and is in a glasses shape in section. The barrel 4 has a material supply port 5 formed on the upstream side in the axial direction. The material supply port 5 is formed so as to extend through the interior and the exterior of the barrel 4, thereby permitting the material to be supplied into the interior of the barrel 4. The barrel 4 is provided with an electric heater or a heating device using heated oil (not shown) so that the material supplied from the material supply port 5 can be heated to a melted or half-melted state.

In the illustrated extruder according to this embodiment there are provided a hopper 6 for the supply of both material and additive into the material supply port 5 and an opening 8 for the discharge of gas evaporated from the kneaded material to the exterior of the barrel 4.

As the kneading screw 3, there are provided a pair of right and left kneading screws 3 which are inserted into the glasses-shaped hollow interior of the barrel 4. Each of the paired kneading screws 3, 3 is made up of an axially long spline shaft (not shown) and plural segments fixed onto the spline shaft in a state in which the spline shaft extends through the segments (namely, in skewered state).

There are various kinds of segments as the segments which constitute each kneading screw 3. In each kneading screw 3, plural kinds of segments are combined in various patterns, thereby a material feed section 10 and a material kneading section 11 are formed over predetermined axial ranges.

In each of the kneading screws 3 used in this embodiment, as shown in FIG. 1, the feed section 10 for feeding the supplied material to the downstream side while melting the material, the kneading section 11 for kneading material fed from the feed section 10, and an extruding section 12 for extruding the material kneaded in the kneading section 11 to the downstream side, are disposed in order from the upstream side to the downstream side.

The feed section 10 is made up of plural screw segments 13 disposed axially. The screw segments 13 have screw flights (not shown) which are spirally twisted axially to feed the material from the upstream to the downstream side.

Like the feed section 10, the extruding section 12 is also axially provided with plural screw segments 13 having spirally twisted screw flights. The screw segments 13 in the extruding section 12 are formed in such a manner that the more downstream the screw segment position is, the smaller the segment length. Thus, the more downstream the material position is, the lower the material moving speed, and in this state the material can be pressurized.

The kneading section 11 is made up of plural rotor segments 15 and a kneading disc segment 1. In this embodiment, the kneading section 11 is composed of six rotor segments 15 and one kneading disc segment 1 as an example.

The rotor segments 15 each have plural kneading flights (two in this embodiment) which are spirally twisted axially. With the kneading flights, the material can be extruded to the downstream side while being shorn. The kneading disc segment 1 is disposed on the downstream side of the rotor segments 15.

FIG. 2 illustrates kneading discs 16 to 20, respectively, which constitute the kneading disc segment 1 of this embodiment. FIG. 2A is a front view of the kneading disc segment 1 as seen in the perpendicular-to-axis direction of the associated kneading screw 3 and FIG. 2B comprises sectional views of the constituent kneading discs as seen from the upstream side of the kneading screw 3. In FIG. 2B, [A] to [E] are sectional views of the kneading discs 16 to 20.

As shown in FIG. 2A, the kneading disc segment 1 is disposed between an upstream-side rotor segment 15 and a downstream-side screw segment 13.

As shown in FIG. 2B, the kneading discs 16 to 20 are each a plate member having a generally elliptic sectional shape in the perpendicular-to-axis direction, and a through hole 21 which permits insertion therethough of the spline shaft is formed in the center of the plate member. Plural teeth are formed on an inner periphery surface of the insertion hole 21, the teeth are in engagement with the spline shaft, thereby the kneading discs 16 to 20 can rotate integrally with the spline shaft. At both disc top ends spaced remotest from the rotational center there are formed tip portions 22. The tip portions 22, 22 are adapted to rotate to graze the inner periphery surface of the barrel 4, thereby the material adhered to the barrel 4 can be wholly scraped off and kneaded.

The five kneading discs 16 to 20 which constitute the kneading disc segment 1 are classified into two types according to mounting angles to the spline shaft. One type comprises first kneading discs D1 disposed on the upstream side and the other comprises second kneading discs D2 mounted on the downstream side of the first kneading discs D1, the second kneading discs D2 having a phase difference δ of an acute angle in the direction opposite to the rotational direction of the kneading screw 3 with respect to the first kneading discs D1. That is, in this embodiment, the kneading discs 16, 18 and 20 are the first kneading discs D1, while the kneading discs 17 and 19 are the second kneading discs D2.

The first and second kneading discs D1, D2 are disposed alternately in the axial direction and constitute one disc set. In this embodiment, the kneading disc segment 1 is constituted by two disc sets 25 and 26 disposed continuously in the axial direction and one first kneading disc D1 disposed downstream of those disc sets. That is, the upstream-side disc set 25 is composed two kneading discs 16, 17 and the downstream-side disc set 26 is composed of two kneading discs 18, 19.

In the disc set 25, the phase difference between the first and second kneading discs D1, D2 is δ° which is an acute angle in the reverse rotational direction of the kneading screw 3. Preferably, the phase difference δ takes a value in the range of 30° to 68° (30° in this embodiment). Consideration is given here to the case where the disc set 25 is constituted by the first and second kneading discs D1, D2 with a phase difference δ of 30° to 68°. When the disc set 25 is rotated, the material can be grasped by both first kneading disc D1 and second kneading disc D2 which kneads the material concentratedly while allowing it to stay there. Thus, a high degree of kneading can be attained by kneading the material concentratedly under retention of the material.

The phase difference between the second kneading disc D2 in the upstream-side disc set 25 and the first kneading disc D1 in the downstream-side kneading disc 26 is (180−δ)° (150° in this embodiment) in the reverse rotational direction of the kneading screw 3. In other words, between the disc sets 25 and 26 adjacent each other in the axial direction, the phase difference between the first kneading discs D1 and the phase difference between the second kneading discs are each 180°. Thus, there is no phase difference in appearance. Upon rotation of the disc sets, the material can be grasped positively by the second kneading discs D2 after the first kneading discs D1. Therefore, even if the phase difference δ between the first and second kneading discs D1, D2 is set as small as 30° to 68°, there scarcely occurs any feed function for the material and the material can be kneaded to a satisfactory extent while being allowed to stay in the kneading section 11. And high degree of kneading can be realized.

It is preferable that at least plural (two or more) disc sets 25 be provided in the kneading section 11. This is because, by providing at least plural disc sets 25, it becomes possible to knead the material in a more positive manner and hence possible to attain a high degree of kneading.

Figure 5:
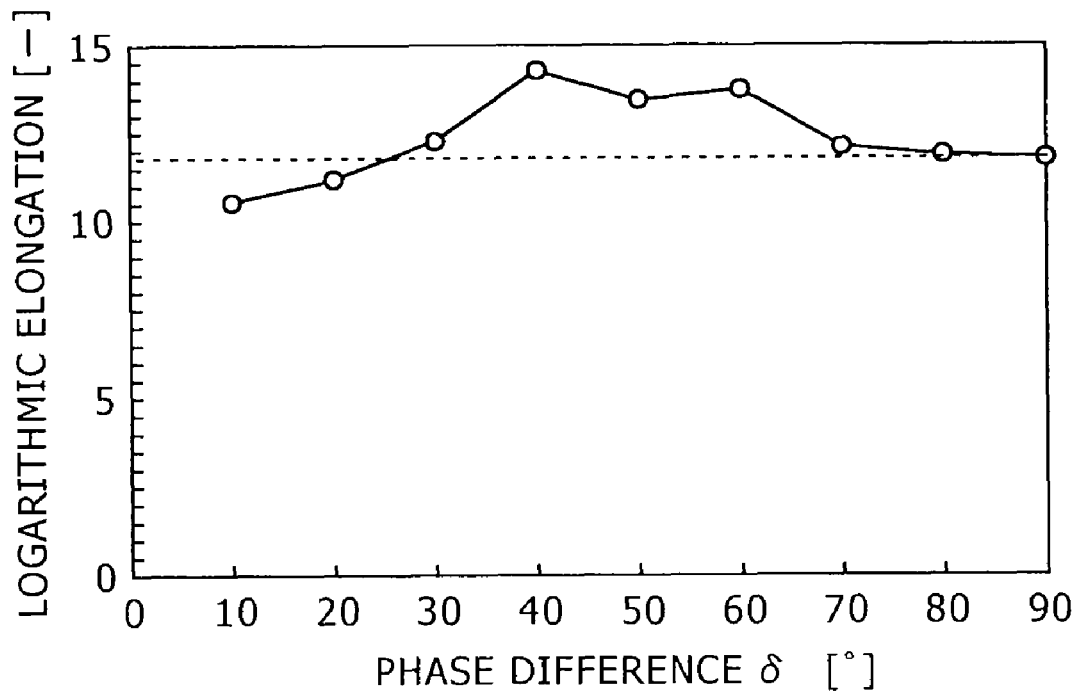
FIG. 5 illustrates a change of logarithmic elongation relative to the phase difference δ.

As is seen from FIGS. 4 and 5, particularly when the retention time is to be prolonged or when the distribution mixing property is to be enhanced, this can be attained by setting the phase difference δ to a value of 30° or more and less than 80°. Likewise, as is seen from FIG. 6, particularly when the dispersion mixing property is to be enhanced, this can be attained by setting the phase difference δ to a value of 10° or more and less than 68°.

EXAMPLE

The present invention will be described below by way of a working example and a comparative example.

In each of the working and comparative examples, as shown in FIG. 3, the influence of the phase difference δ between the first and second kneading discs D1, D2 in the kneading disc segment 1 on the degree of kneading was calculated by computer simulation.

The kneading disc segment 1 used in the simulation is axially provided with a spline shaft having a diameter of 20 mm, and five kneading discs 16 to 20 are mounted continuously on the spline shaft with 5 mm spaced as an approach length from the upstream side. The five kneading discs 16 to 20 are disposed in the order of the first kneading disc D1, second kneading disc D2, first kneading disc D1, second kneading disc D2, and first kneading disc D1, from the upstream side. Each disc has a phase difference around the axis of the spline shaft and in the reverse rotational direction of the kneading screw 3. As shown in FIG. 2, such phase differences are δ°, (180−δ)°, δ°, and (180−δ)°, with respect to the kneading disc adjacent on the upstream side.

Conditions for the kneading performed using the kneading disc segment 1 described above were set as in Table 1.

TABLE 1

| KNEADING DISC SEGMENT | |
|---|---|
| Number of Discs | 5 |
| Disc Size | Max. rotational dia. 45 mm |
| Spline Shaft | Shaft dia. 20 mm |
| BARREL | |
| Inside Diameter | 46 mm |
| CONDITIONS FOR OPERATION | |
| Number of Revolutions | 260 rpm |
| Flow Rate | 78 kg/h |
| MATERIAL | |
| Kind | Polypropylene resin |
| Density | 750 kg/m$^3$ |

In accordance with the experiment conditions shown in Table 1, the following evaluation indices were calculated and evaluations were conducted.

In calculating the evaluation indices, since the material in a melted state can be treated as a non-Newtonian fluid, material viscosities η (mPa·sec) in various states were calculated using Carreau Model (Pierre J. Carreau Daniel C. R. De Kee, Raj P. Chhabra, "Rheology of Polymeric Systems," Hanser Publisher, 1997, p. 39) shown in the following equation (1):

$$\eta = \eta_\infty + (\eta_0 - \eta_\infty)\left[1 + (\lambda\dot{\gamma})^2\right]^{\frac{n-1}{2}} \quad (1)$$

η: material viscosity (mPa·sec)
$\eta_\infty$: viscosity at a shear rate of infinity (mPa·sec)
$\eta_0$: viscosity at a shear rate of zero (mPa·sec)
λ: time constant (−)
n: power law constant (−)

In the above equation, $\eta_0$ represents viscosity at a shear rate of zero and in this example it is 8100 mPa·sec, $\eta_\infty$ represents viscosity at a shear rate of infinity and in this example it is 1 mPa sec, λ represents a time constant, which is usually 0.6 to 1, and in this example λ=1, and n represents a power law constant and in this example n=0.385.

The degree of kneading was evaluated using a particle tracing method. According to the particle tracing method, the degree of kneading is evaluated by the history of strain rate and stress which the material particles being carried on the flow of material (resin) undergo. Mixing is classified into dispersion mixing and distribution mixing. In this example, dispersion mixing and distribution mixing were evaluated in terms of energy and logarithmic elongation, respectively.

Evaluation indices and evaluation results are as shown by the following (1) to (3):

(1) Retention Time 1000 material particles were arranged randomly in an upstream-side section of the kneading disc segment 1, then the time (retention time) until end of passing the kneading disc segment 1 at a speed based on flow analysis was determined by calculation with respect to all the material particles and a mean value was used an average retention time.

In FIG. 4, the phase difference δ was varied in the range of 10° to 90° and the retention time was determined for each of the varying cases.

From FIG. 4 it is seen that at a phase difference δ of 30° to 70° the retention time is longer than in the neutral kneading disc segment with a phase difference δ of 90° and that the material is easy to stay in the kneading section 11. It is also seen that at a phase difference δ of 10° to 20° or at a phase difference δ of 80° the retention time is equal to or shorter than in the neutral kneading disc segment with a phase difference δ of 90° and that the material flows in a short time to the downstream side from the kneading section 11.

Further, for making clear the comparison with the neutral kneading disc segment, values (divided values) each normalized using the retention time at δ=900 are shown in Table 2.

TABLE 2

| Phase Difference δ [°] | Retention Time τ [—] | Logarithmic Elongation [—] | Energy [—] |
| --- | --- | --- | --- |
| 10 | 0.972 | 0.904 | 1.425 |
| 20 | 0.919 | 0.959 | 1.436 |
| 30 | 1.038 | 1.062 | 1.388 |
| 40 | 1.310 | 1.218 | 1.445 |
| 50 | 1.260 | 1.145 | 1.340 |
| 60 | 1.268 | 1.185 | 1.192 |
| 70 | 1.194 | 1.050 | 0.953 |
| 80 | 0.999 | 1.022 | 0.912 |
| 90 | 1.000 | 1.000 | 1.000 |

In Table 2, when the retention time is larger than 1.0, it is considered that the material is easier to stay in the kneading section and the degree of kneading is higher than in the conventional neutral kneading disc segment. On the other hand, when the retention time is smaller than 1.0, it is considered that the material is easier to flow to the downstream and the degree of kneading is lower than in the conventional neutral kneading disc segment.

Thus, in view of the results of Table 2, it is considered that by using the kneading disc segment 1 with a phase difference δ of 30° to 70° the retention time as one of kneading degree evaluation indices can be made longer than in the conventional neutral kneading disc segment and that the degree of kneading can be improved.

(2) Logarithmic Elongation

With reference to the definition described in a literature (J. M. Ottino, "The Kinematics of Mixing: Stretching, Chaos, and Transport," Cambridge University Press, 1989), 1000 virtual line elements were arranged randomly in an upstream-side section of the kneading disc segment 1, then the elongation rate until end of passing the kneading disc segment 1 at a speed based on flow analysis was calculated with respect to all the line elements (material particles) and a logarithmic mean value was used as an average logarithmic elongation rate. In FIG. 5, the phase difference δ was varied in the range of 10° to 90° and the logarithmic elongation was determined for each of the varying cases.

From FIG. 5 it is seen that at a phase difference δ of 30° to 80° the logarithmic elongation is larger than in the conventional neutral kneading disc segment with a phase difference δ of 90° and that the material elongated (displaced) largely during kneading. It is also seen that at a phase difference δ of 10° to 20° the logarithmic elongation is smaller than in the conventional neutral kneading disc segment with a phase difference δ of 90° and that the material did not elongate (displace) so much during kneading.

Further, for making clear the comparison with the conventional neutral kneading disc segment, values (divided values) which are normalized using the logarithmic elongation at δ=90° are shown in Table 2.

In Table 2, when the logarithmic elongation is larger than 1.0, it is considered that the material transformation quantity (displacement quantity) is larger and the degree of kneading is higher than in the use of the conventional neutral kneading disc segment. On the other hand, when the elongation rate is smaller than 1.0, it is considered that the material transformation quantity (displacement quantity) is smaller and the degree of kneading is lower than in the use of the conventional neutral kneading disc segment.

Thus, in view of the results of Table 2, it is considered that by using the kneading disc segment 1 with a phase difference δ of 30° to 80° the material is largely displaced during kneading and the degree of kneading can be made higher than in the use of the conventional neutral kneading disc segment.

(3) Energy 1000 material particles were arranged randomly in an upstream-side section of the kneading disc segment 1 and a time integral value of the product of strain rate and stress until end of passing the kneading disc segment 1 at a speed based on flow analysis was determined by calculation with respect to all the material particles and was used as energy.

Figure 6:
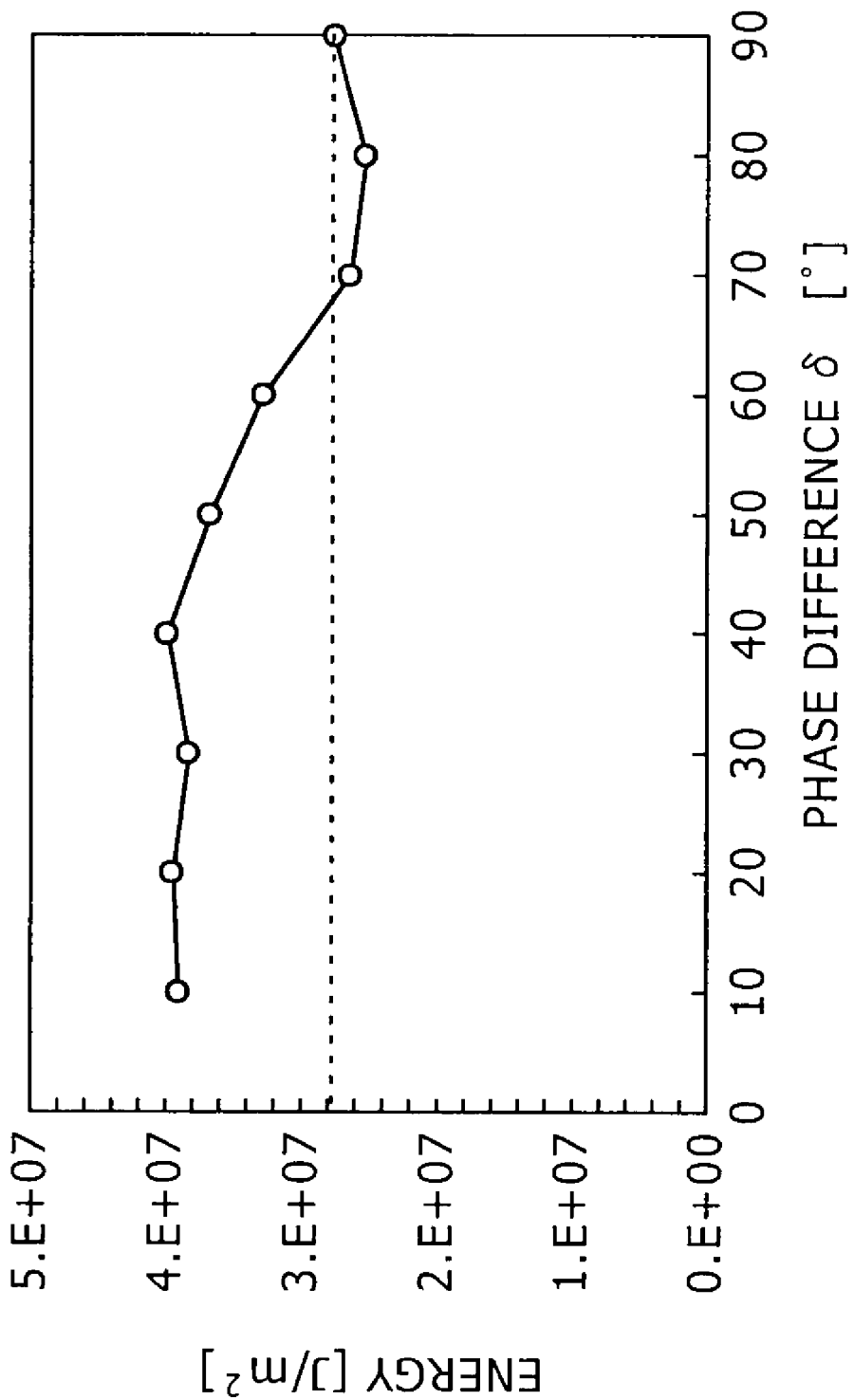
FIG. 6 illustrates a change of energy relative to the phase difference δ.

In FIG. 6, the phase difference δ was varied in the range of 10° to 90° and energy was determined for each of the varying cases.

From FIG. 6 it is seen that at a phase difference δ of 10° to 68° energy is higher than in the conventional neutral kneading disc segment with a phase difference δ of 90° and that large energy was exerted on the material during kneading. It is also seen that at a phase difference δ of 80° the logarithmic elongation is smaller than in the conventional neutral kneading disc segment with a phase difference δ of 90° and that energy was not exerted so much on the material during kneading.

Further, for making clear the comparison with the conventional neutral kneading disc segment, values (divided values) which are normalized using energy at δ=90° are shown in Table 2.

In Table 2, when energy is larger than 1.0, it is considered that more energy was exerted on the material than in the use of the conventional neutral kneading disc segment and that the degree of kneading becomes high. On the other hand, when energy is smaller than 1.0, it is considered that the energy applied to the material is smaller and the degree of kneading is lower than in the use of the conventional neutral kneading disc segment.

Thus, in view of the results of Table 2, it is considered that by using the kneading disc segment 1 with a phase difference δ of not larger than 68° large energy is imparted to the material during kneading and the degree of kneading can be made higher than in the use of the neutral kneading disc segment.

As to the range of the phase difference, the range of 30° to 68° is most suitable with respect to all of retention time, material elongation and applied energy. In the present invention, however, the phase difference range is not limited to the range just mentioned. The phase difference may be determined taking note of only the required one of the above three items. For example, in the case of a use which requires consideration for only the retention time, the phase difference may be determined in the range of 30° to 70°.

The present invention is not limited to the above embodiment, the shape, structure and material quality, combination and the like may be changed for constituent member as necessary within the scope not altering the essence of the invention.

For example, although the above embodiment is related to the completely intermeshed type twin-screw extruder 2, the kneading disc segment 1 according to the present invention is applicable also to a single- or three- or more screw extruder 2, or a twin-screw extruder 2 which is not a completely intermeshed type, or a continuous kneader.

In mounting disc sets continuously, a segment or spacer not having a feed function may be disposed between adjacent disc sets.

What is claimed is:

1. A kneading disc segment mounted on a kneading screw for kneading a material while feeding the material to a downstream side during rotation of the kneading screw, and constituted by a combination of plural kneading discs, said kneading disc segment comprising:
   a plurality of disc sets disposed sequentially and continuously in the axial direction of said kneading screw, said disc sets each comprising two discs and not more than two discs, the two discs of each said set comprising a first kneading disc and a second kneading disc, said second kneading disc being mounted continuously with, and downstream of, said first kneading disc in the direction of feeding the material, wherein the second kneading disc has a phase difference δ of an acute angle relative to said first kneading disc, the phase difference δ being in a direction opposite the direction of rotation of the kneading screw,
   wherein said first kneading discs in each of said plural continuous disc sets have a phase difference of 180° with each other, whereby there is no phase difference in appearance between the first kneading discs in said plural continuous disc sets.

2. The kneading disc segment according to claim 1, wherein said phase difference δ is in the range of 30° to 68°.

3. The twin-screw extruder comprising two co-rotating intermeshed kneading screws each having said kneading disc segment described in claim 1.

* * * * *